Patented Oct. 21, 1952

2,614,998

UNITED STATES PATENT OFFICE 2,614,998

LOW WATER-LOSS CEMENT SLURRY

Peggy J. Lea, Merriam, Kans., assignor to Phillips Petroleum Company, a corporation of Delaware No Drawing. Application September 19, 1949, Serial No. 116,628

18 Claims. (Cl. 260—29.6)

This invention relates to low water-loss cement slurries. In one aspect, it relates to low water-loss cement slurries comprising a hydraulic cement, sufficient water to form a slurry, and an effective amount of a water-loss reducer. In another aspect, it relates to low water-loss cements containing a non-cement, inert, granular aggregate material. In still another aspect, it relates to a low water-loss cement slurry containing an effective amount of a set-retarder. In still another aspect, it relates to a hydraulic cement slurry having a retarded set.

In the art of cementing oil wells and in grouting cracks in masonry structures there is a tendency for the cement slurry to lose water to such an extent that it becomes dehydrated, set, or cracked prematurely. The result is that it cannot be properly placed in position because of an increase in viscosity of the slurry, and resulting increase in the force necessary to pump or move the slurry into position. This undesirable dehydration is increased in many oil wells by the modern practice of scratching, or scraping the drilling mud from the wall of the well by mechanical means prior to placing the cement, which often exposes porous formations which will absorb the water from the slurry. This is particularly important when oil sands are penetrated. Artificial contamination of oil sands with water will often cause shaley impurities in the sand to swell and reduce the permeability of said oil sand to a very great extent. Therefore water lost from the slurry tends to seal off the formation to oil flow. When it is intended to cement with slurry, and then gun perforate the hardened cement, the gun perforator may not be able to penetrate into the region beyond that in which the shaley impurities are swollen by the water extracted from the slurry. In such cases the oil production rate of the well may be severely reduced by water contamination from the slurry.

I have discovered a method for retarding the set of cement and for reducing the filtration of water from cement slurries to the absorbent surrounding formations and the resulting contamination of such formations. I do this by adding to the cement slurry a small amount of a water-soluble or dispersible resin selected from the group consisting of water-soluble alkali salts of partially hydrolyzed polyacrylamide and polyacrylic acid.

One object of the present invention is to provide an improved low water-loss cement slurry useful for grouting in general, for cementing the walls of wells, and for cementing pipe in wells.

Another object is to provide a low water-loss cement which will not contaminate the earth formations in bore holes with water to any substantial degree.

Another object is to provide a cement slurry suitable for use in oil well cementing operations.

Another object is to provide a low water-loss cement.

Another object is to provide a cement having a retarded set.

Numerous other objects and advantages will be apparent upon reading the accompanying specification and claims.

In preparing the low-water-loss cement slurry, the dry ingredients, comprising hydraulic cement, the additives for increasing the time of set, and reducing the water loss, and the inert filler material, such as sand or crushed limestone, may be mixed together and later mixed with water. Alternatively, the water-loss reducers may be mixed separately with hot or cold water, and then added to the cement to form the slurry. The mixing of the hydraulic cement with water must, of course, be done promptly before placing the slurry in position.

The amount of my water soluble resins required will ordinarily lie between 0.10 and 3.0 per cent based on the weight of dry cement. The preferred amount will ordinarily lie between 0.25 and 2.0 per cent. If less additive is used, the resulting water-loss reduction or set retardation will be correspondingly low. Above the upper limit, the results are too great for practical uses.

By hydraulic cement we intend to include all mixtures of lime, silica, and alumina, or of lime and magnesia, silica, and alumina and iron oxide as are commonly known as hydraulic cements. Hydraulic cements include hydraulic limes, grappier cements, puzzolan cements, natural cements, and Portland cements. Puzzolan cements include slag cements made from slaked lime and granulated blast furnace slag. Because of its superior strength, Portland cement is preferred among the hydraulic cements. In the art, hydraulic cements are recognized as a definite class, and as results of value may be obtained with any member of that class, it is intended to claim all hydraulic cements.

In most oil well cementing and grouting operations it is generally desirable to use neat cement for added strength, but, obviously, it is always possible to add a certain amount of an inert granular filling material or aggregate such as sand, ground limestone, or any of the other well-known inert aggregates, as long as the amount added does not reduce the strength of the cement below the desired value. In operations in open wells it is often desirable to use neat cement, because inert filling material will automatically become detached from the walls of the well, and will tend to mix with and dilute the slurry to such an extent that it is undesirable to add any filling material to the slurry being forced into the well.

The amount of water added is not critical. It is obvious that the amount of water should be only sufficient to form a pumpable slurry. No more water need be added. One advantage of the low water-loss slurry of the present invention is that it is not necessary to add water in excess of the amount needed for making the slurry pumpable. Any additional amount as a reserve for expected losses would tend to reduce the strength of the cement.

I have found that the addition of a minor amount of my additives to the cement slurry increases the setting time and reduces the rate of water-loss from the slurry to any water-absorbent medium with which the slurry is in contact.

Sodium polyacrylate is polymerized sodium acrylate or the sodium salt of polyacrylic acid. It is available commercially as Acrysol GS.

The carboxyl-containing polyacrylamide resin is polymerized acrylamide which has been partially hydrolyzed so that a portion of the amide groups have been converted to carboxyl groups. This resin is presently available from Hercules Powder Company as Resin S-139 "A," which is the sodium salt.

Instead of the sodium salts, any of the water-soluble alkali salts of polyacrylic acid and carboxyl-containing polyacrylamide resins may be used. By the term "alkali salts," I intend to include the alkali metal, alkaline earth metal, ammonium, magnesium, and organic base salts. If organic base salts are used, the base should be one which is stronger than ammonia. Examples are the tertiary amines. For reasons of economy, the sodium salts are preferred.

My method is effective in reducing the water-loss from any hydraulic cement such as Portland cement or Starcor, which is a hydraulic cement having a retarded set. Starcor differs from Portland cement in that it contains $2CaO.Fe_2O_3$ instead of $3CaO.Al_2O_3$, and has a high ratio of di-calcium silicate to tri-calcium silicate, whereas Portland cement has a high ratio of tri-calcium silicate to the di-calcium silicate.

My water-loss reducing agents may be mixed with the cement before the addition of water, they may be added to the slurry at the time of mixing, or they may even be added to the water before the mixing of the cement slurry.

Tests were carried out with Portland cement to determine the effectiveness of my additives for reducing the water loss or retarding the set. It will be noted that in some cases, the water loss for a very short period is shown. In those cases where the water loss was complete in less than the usual 30 minute test period, the time for complete water loss is shown along with the amount of filtrate.

In each of the following examples the amount of additive is expressed as the weight per cent based on the amount of dry cement. In each sample, the amount of water is that amount required to give a slurry having an approximate density of 16.3 pounds per gallon. The samples were prepared by adding the required amount of additive and water to a weighed portion of Portland cement. The mixtures were stirred with a spatula for about 30 seconds and then were stirred for about 3 minutes on a laboratory mixer. The following table presents the results of these tests:

| Additive | Conc. of additive, as percent of cement | Water loss, ml./min., at 100 p. s. i. | Hours to 100 poises |
|---|---|---|---|
| None | | 45/0.4 | 1.0 |
| Sodium polyacrylamide | 1 | 23/0.5 | 10.5 |
| Sodium polyacrylate | 0.25 | 18/0.2 | 2 |
| Phenol-formaldehyde resin | 1 | 40/0.3 | 8.1 |

The phenol-formaldehyde in the above table is tested to show that other resins are not equivalent to salts of polyacrylamide or polyacrylate. This phenol-formaldehyde resin was prepared by the method described in volume 1, page 321, of "Chemistry of Synthetic Resins," Carleton Ellis, 1935 edition. The degree of polymerization was such that a resinous material was formed but the polymerization was not carried to the point where the resin is insoluble in water. The solubility was at least 6 pounds of resin per 42 gallons of water.

A portion of each sample was allowed to set to determine the suitability for use in well-cementing and grouting. The treated samples set into hard cement having acceptable physical properties. The blank samples, which had high water losses, set in a cracked and weakened condition. This was, no doubt, the result of incomplete hydration of the cement due to a lack of sufficient water during the setting.

The use of inert filling material in my low-water-loss cement may be practiced within the scope of my invention.

The foregoing tests have been given for the purpose of illustrating and explaining my invention and it is not intended to limit my invention to the use of the specific mixtures or compositions used in the tests. My invention is defined by the following claims.

Having described my invention, I claim:

1. A cement capable of forming a fluid slurry when mixed with water, said cement comprising a dry hydraulic cement mixed with from 0.1 to 3 weight per cent based on said dry hydraulic cement of a water-soluble resin selected from the group consisting of water-soluble salts of alkali metal, alkaline earth metal, magnesium, ammonium, and organic bases more basic than ammonia, of polyacrylic acid and carboxyl-containing polyacrylamide.

2. A cement capable of forming a fluid slurry when mixed with water, said cement comprising a dry hydraulic cement mixed with from 0.1 to 3 weight per cent based on said dry hydraulic cement of sodium polyacrylate.

3. A cement capable of forming a fluid slurry when mixed with water, said cement comprising a dry hydraulic cement mixed with from 0.1 to 3 weight per cent based on said dry hydraulic cement of sodium polyacrylamide.

4. A cement capable of forming a fluid slurry when mixed with water, said cement comprising a dry Portland cement mixed with from 0.1 to 3 weight per cent based on said dry Portland cement of a water-soluble resin selected from the group consisting of water-soluble salts of alkali metal, alkaline earth metal, magnesium, ammonium, and organic bases more basic than ammonia, of polyacrylic acid and carboxyl-containing polyacrylamide.

5. A cement capable of forming a fluid slurry when mixed with water, said cement comprising a dry Portland cement mixed with from 0.1 to 3 weight per cent based on said dry Portland cement of sodium polyacrylate.

6. A cement capable of forming a fluid slurry when mixed with water, said cement comprising a dry Portland cement mixed with from 0.1 to 3 weight per cent based on said dry Portland cement of sodium polyacrylamide.

7. A hydraulic cement slurry comprising a hydraulic cement, from 0.1 to 3 weight per cent based on said dry hydraulic cement of a water-soluble resin selected from the group consisting of water-soluble salts of alkali metal, alkaline earth metal, magnesium, ammonium, and organic bases more basic than ammonia, of polyacrylic acid and carboxyl-containing polyacrylamide, and sufficient water to form a pumpable slurry.

8. A hydraulic cement slurry comprising a hydraulic cement, from 0.1 to 3 weight per cent based on said dry hydraulic cement of sodium polyacrylate and sufficient water to form a pumpable slurry.

9. A hydraulic cement slurry comprising a hydraulic cement, from 0.1 to 3 weight per cent based on said dry hydraulic cement of sodium polyacrylamide and sufficient water to form a pumpable slurry.

10. A hydraulic cement slurry comprising a Portland cement, from 0.1 to 3 weight per cent based on said dry Portland cement of a water-soluble resin selected from the group consisting of water-soluble salts of alkali metal, alkaline earth metal, magnesium, ammonium, and organic bases more basic than ammonia, of polyacrylic acid and carboxyl-containing polyacrylamide, and sufficient water to form a pumpable slurry.

11. A hydraulic cement slurry comprising a Portland cement, from 0.1 to 3 weight per cent based on said dry Portland cement of sodium polyacrylate and sufficient water to form a pumpable slurry.

12. A hydraulic cement slurry comprising a Portland cement, from 0.1 to 3 weight per cent based on said dry Portland cement of sodium polyacrylamide and sufficient water to form a pumpable slurry.

13. The process of producing a hydraulic cement aqueous slurry which comprises admixing with hydraulic cement from 0.1 to 3 weight per cent based on said dry hydraulic cement of a water soluble resin selected from the group consisting of water-soluble salts of alkali metal, alkaline earth metal, magnesium, ammonium and organic bases more basic than ammonia, of polyacrylic acid and carboxyl-containing polyacrylamide, and interacting therewith sufficient water to produce a fluid slurry.

14. The process of producing a hydraulic cement aqueous slurry which comprises admixing with hydraulic cement from 0.1 to 3 weight per cent based on said dry hydraulic cement of sodium polyacrylate and interacting therewith sufficient water to produce a fluid slurry.

15. The process of producing a hydraulic cement aqueous slurry which comprises admixing with hydraulic cement from 0.1 to 3 weight per cent based on said dry hydraulic cement of sodium polyacrylamide and interacting therewith sufficient water to produce a fluid slurry.

16. The process of producing a hydraulic cement aqueous slurry which comprises admixing with Portland cement from 0.1 to 3 weight per cent based on said dry Portland cement of a water-soluble resin selected from the group consisting of water-soluble salts of alkali metal, alkaline earth metal, magnesium, ammonium, and organic bases more basic than ammonia, of polyacrylic acid and carboxyl-containing polyacrylamide and interacting therewith sufficient water to produce a fluid slurry.

17. The process of producing a hydraulic cement aqueous slurry which comprises admixing with Portland cement from 0.1 to 3 weight per cent based on said dry Portland cement of sodium polyacrylate and interacting therewith sufficient water to produce a fluid slurry.

18. The process of producing a hydraulic cement aqueous slurry which comprises admixing with Portland cement from 0.1 to 3 weight per cent based on said dry Portland cement of sodium polyacrylamide and interacting therewith sufficient water to produce a fluid slurry.

PEGGY J. LEA.

REFERENCES CITED

The following references are of record in the file of this patent:

UNITED STATES PATENTS

| Number | Name | Date |
|---|---|---|
| 2,089,813 | Rice | Aug. 10, 1937 |
| 2,233,974 | Dunn | Mar. 4, 1941 |

FOREIGN PATENTS

| Number | Country | Date |
|---|---|---|
| 562,268 | Great Britain | June 26, 1944 |